United States Patent
Edholm et al.

(10) Patent No.: US 9,491,907 B2
(45) Date of Patent: Nov. 15, 2016

(54) HANDLE CONTROL ARRANGEMENT OF A WALK-BEHIND LAWN MOWER

(75) Inventors: Fredrik Edholm, Jönköping (SE); Helena André, Bankeryd (SE); Jörgen Johansson, Jönköping (SE); Mikael Adolfsson, Gränna (SE); Magnus Henriksson, Jököping (SE); Jasmin Insanic, Jönköping (SE); Jonas Tibbelin, Huskvarna (SE)

(73) Assignee: HUSQVARNA AB, Huskvarna (SE)

( * ) Notice: Subject to any disclaimer, the term of this patent is extended or adjusted under 35 U.S.C. 154(b) by 84 days.

(21) Appl. No.: 14/000,691

(22) PCT Filed: Feb. 21, 2011

(86) PCT No.: PCT/SE2011/050188
§ 371 (c)(1),
(2), (4) Date: Mar. 10, 2014

(87) PCT Pub. No.: WO2012/115543
PCT Pub. Date: Aug. 30, 2012

(65) Prior Publication Data
US 2014/0190141 A1  Jul. 10, 2014

(51) Int. Cl.
*A01D 34/82* (2006.01)
*A01D 34/68* (2006.01)
*A01D 43/063* (2006.01)

(52) U.S. Cl.
CPC ............. *A01D 34/824* (2013.01); *A01D 34/68* (2013.01); *A01D 34/828* (2013.01); *A01D 43/063* (2013.01)

(58) Field of Classification Search
CPC ........... A01D 43/063; A01D 43/0631; A01D 34/6812; A01D 34/824; A01D 75/206; A01D 2034/6843; A01D 34/822; A01D 34/68; A01D 34/828
See application file for complete search history.

(56) References Cited

U.S. PATENT DOCUMENTS 2,736,153 A * 2/1956 Dunn ................ A01D 34/6806
123/146.5 R
2,786,694 A * 3/1957 Gray .................... A01D 34/824
280/47.371

(Continued)

FOREIGN PATENT DOCUMENTS

CN  102097427 A  6/2011
DE  2115921 A1  8/1972

(Continued)

OTHER PUBLICATIONS

International Search Report and Written Opinion of PCT/SE2011/050188 mailed Sep. 30, 2011.

(Continued)

*Primary Examiner* — Alicia Torres
*Assistant Examiner* — Adam Behrens
(74) *Attorney, Agent, or Firm* — Nelson Mullins Riley & Scarborough LLP (57) ABSTRACT

A walk-behind lawn mower comprising a body with an engine driving a cutting blade, and a handle assembly which is pivotably connected to the body. The lawn mower furthermore comprises a handle control arrangement for controlling pivotal movement of the handle assembly relative to the body, between a working position and a pivoted position. The handle control arrangement comprises a locking member, selectively displaceable between an open state in which the locking member allows pivotal movement of the handle assembly from the working position to the pivoted position, and a locked state in which the locking member inhibits pivotal movement of the handle assembly from the working position to the pivoted position. The handle control arrangement also comprises an actuating member operatively connected to the locking member and controlling the state of the locking member. The actuating member is also arranged to control activation and deactivation of a device arranged to inhibit rotation of the cutting blade of the walk-behind lawn mower.

20 Claims, 12 Drawing Sheets

(56) References Cited

U.S. PATENT DOCUMENTS

| | | | |
|---|---|---|---|
| 3,481,123 A * | 12/1969 | Lessig | A01D 34/824 116/112 |
| 3,636,686 A | 1/1972 | Meyer et al. | |
| 3,721,078 A | 3/1973 | Haffner | |
| 3,764,156 A | 10/1973 | Nepper et al. | |
| 3,791,116 A | 2/1974 | Wykhuis | |
| 3,893,284 A * | 7/1975 | Thon | A01D 43/0631 56/202 |
| 3,928,956 A * | 12/1975 | Boyer | A01D 43/063 56/202 |
| 3,949,540 A | 4/1976 | Christopherson et al. | |
| 3,962,852 A | 6/1976 | Boyer | |
| 3,971,198 A * | 7/1976 | Lane | A01D 43/063 56/16.6 |
| 4,043,102 A * | 8/1977 | Uhlinger | A01D 43/0636 56/17.4 |
| 4,345,418 A * | 8/1982 | Arizpe | A01D 43/063 56/10.5 |
| 4,419,857 A * | 12/1983 | Smith | A01D 34/6812 477/204 |
| 4,470,246 A | 9/1984 | Donegan | |
| 4,478,031 A | 10/1984 | Wolf | |
| 4,753,062 A * | 6/1988 | Roelle | A01D 34/6806 56/10.5 |
| 4,897,988 A | 2/1990 | Schweitz et al. | |
| 4,984,419 A | 1/1991 | Sampei et al. | |
| 5,050,371 A * | 9/1991 | Tharman | A01D 34/6806 56/10.5 |
| 5,163,275 A * | 11/1992 | Hare | A01D 34/824 280/47.36 |
| 5,636,504 A * | 6/1997 | Kaley | A01D 34/001 16/437 |
| 6,698,173 B2 * | 3/2004 | Joseph | A01D 34/001 56/11.3 |
| 7,231,755 B2 | 6/2007 | Clarke | |
| 7,448,195 B2 | 11/2008 | Kohler | |
| 7,496,990 B2 * | 3/2009 | Qiao | A01D 34/824 16/437 |
| 8,578,691 B2 * | 11/2013 | Lahey | A01D 34/71 56/202 |
| 8,698,298 B2 | 4/2014 | Henrik et al. | |
| 9,038,356 B2 | 5/2015 | Shao et al. | |
| 2002/0023421 A1 * | 2/2002 | Kutsukake | A01D 43/063 56/320.2 |
| 2002/0084117 A1 * | 7/2002 | Joseph | A01D 34/001 180/19.3 |
| 2003/0182919 A1 | 10/2003 | Baumann et al. | |
| 2005/0109002 A1 | 5/2005 | Peter et al. | |
| 2005/0188664 A1 * | 9/2005 | Clarke | A01D 34/824 56/14.7 |
| 2005/0284121 A1 | 12/2005 | Lida et al. | |
| 2006/0053762 A1 * | 3/2006 | Stover | A01D 34/824 56/16.7 |
| 2008/0257093 A1 * | 10/2008 | Cox | A01D 34/824 74/489 |
| 2011/0302899 A1 | 12/2011 | Park | |
| 2011/0308217 A1 | 12/2011 | Lahey et al. | |
| 2012/0260619 A1 | 10/2012 | Haraqia et al. | |
| 2013/0111866 A1 | 5/2013 | Schmalz | |
| 2014/0047811 A1 | 2/2014 | Lahey et al. | |

FOREIGN PATENT DOCUMENTS

| | | | | |
|---|---|---|---|---|
| DE | 9411192 U1 | 9/1994 | | |
| EP | 0903074 A1 | 3/1999 | | |
| EP | 1452085 A2 | 9/2004 | | |
| EP | 1591002 A1 * | 11/2005 | | A01D 43/063 |
| EP | 1690444 B1 | 8/2006 | | |
| EP | 2476303 A1 | 7/2012 | | |
| FR | EP 0903074 A1 * | 3/1999 | | A01D 43/0631 |
| GB | 1585875 A | 3/1981 | | |
| WO | 2010085258 A1 | 7/2010 | | |
| WO | 2012115543 A1 | 8/2012 | | |

OTHER PUBLICATIONS

International Search Report and Written Opinion of PCT/US2009/031996 mailed Oct. 16, 2009.

International Preliminary Report on Patentability for PCT/US2009/031996 issued Jul. 26, 2011.

* cited by examiner

HANDLE CONTROL ARRANGEMENT OF A WALK-BEHIND LAWN MOWER

TECHNICAL FIELD

This invention relates to walk-behind lawn mowers. Especially, the invention relates to walk-behind lawn mowers equipped with a grass collector.

BACKGROUND OF THE INVENTION

Walk-behind lawn mowers are well known for mowing grass. Such mowers comprise a body having a cutting chamber carrying a rotary cutting blade. A handle assembly extends upwardly and rearwardly from the body. An operator grips the handle assembly and walks behind the mower to guide and control the mower.

Grass clippings resulting from rotation of the cutting blade may be conducted from the cutting chamber to a discharge opening of the body, and further into a grass collector connected to the body.

Emptying of the grass collector is often complicated since the operator has to detach the grass collector and remove it from the mower by means of lifting it upwards and backwards through the handle assembly. When the grass collector is filled with grass clippings it is usually heavy and unwieldy, making the detaching and lifting procedure awkward. The space around the grass collector is generally very limited and loose cables or other objects protruding from the handle might obstruct the detaching operation.

Accordingly, there is a need for an arrangement providing a simplified way to remove a grass collector from a walk-behind lawn mower.

SUMMARY OF THE INVENTION

It is an object of the present invention to provide an improved solution that alleviates the mentioned drawbacks with present walk-behind lawn mowers.

According to an aspect of the solution, this object is achieved by a walk-behind lawn mower according to claim 1. The lawn mower comprises a body with an engine driving a cutting blade, and a handle assembly which is pivotably connected to the body. The lawn mower furthermore comprises a handle control arrangement for controlling pivotal movement of the handle assembly relative to the body, between a working position and a pivoted position. The handle control arrangement comprises a locking member, selectively displaceable between an open state in which the locking member allows pivotal movement of the handle assembly from the working position to the pivoted position, and a locked state in which the locking member inhibits pivotal movement of the handle assembly from the working position to the pivoted position. The handle control arrangement also comprises an actuating member operatively connected to the locking member and controlling the state of the locking member. The actuating member is also arranged to control activation and deactivation of a device arranged to inhibit rotation of the cutting blade of the walk-behind lawn mower. By providing a walk-behind lawn mower with a pivotable handle assembly, it becomes easier for the operator to reach the rear end of the lawn mower body. Accordingly, it becomes easier to reach a grass collector which is attached to the rear end of the body. Since the pivotability of the handle is controlled by means of adding a function to an already existing member of the lawn-mower, a simple and cost-efficient solution is achieved.

According to an embodiment of the invention, the actuating member has a resting position associated with the open position of the locking member and activation of the device arranged to inhibit rotation of the cutting blade, and an activated position associated with the locked state of the locking member and activation of the cutting blade. In this way, a simple, safe and intuitive pivoting control is achieved, since the handle assembly is pivotable as long as the cutting blade is not active, and is locked in the working position as long as the cutting blade is active.

According to another embodiment of the invention, the actuating member is connected to an operator grip of the handle assembly. Thereby, the operator of the lawn mower has easy access to the handle control arrangement.

According to yet another embodiment of the invention, the actuating member is operatively connected to the locking member by means of a control wire. Thereby, a simple solution for the handle control assembly is achieved. Moreover, the same control wire as the one used for activation and deactivation of the device arranged to inhibit rotation of the cutting blade may be used. Using the same control wire for both these functions means that fewer components are needed, resulting in a lower cost arrangement.

According to an embodiment of the invention, the control wire operatively connects the actuating member and a blade brake clutch of the lawn mower.

According to another embodiment, the control wire operatively connects the actuating member and the engine.

According to another embodiment of the invention, the locking member is arranged on a first side of the body, and the locking member is arranged to selectively engage and disengage a proximal end of an arm of the handle assembly. Thereby, a simple and intuitive locking arrangement can be provided.

According to an embodiment of the invention, the handle control arrangement comprises a second locking member arranged on a second side of the body, opposite to the first side, which second locking member is arranged to cooperate with a second arm of the handle assembly. Thereby, a robust and stable handle control arrangement is achieved.

According to an embodiment of the invention, the walk-behind lawn mower comprises a grass collector, detachably connected to a rear end of the body, and arranged to collect grass clippings conducted from a cutting chamber to a discharge opening of the body, and a cover, pivotably connected to the rear end of the body, which cover is arranged to cover the discharge opening when the grass collector is detached from the body, and which cover is arranged to rest on top of the grass collector, when the grass collector is attached to the body.

According to an embodiment of the invention the handle assembly comprises a cover engaging member, arranged to cooperate with a portion of the cover, so as to facilitate pivoting of the cover from its position on top of the grass collector to a folded up position, when the handle assembly rotates from the working position to the pivoted position. Thereby, the operator does not use any of his or her hands to fold the cover, and the grass collector is easily reached.

According to a second aspect of the solution, a walk-behind lawn mower is provided, which lawn mower comprises a body, a handle assembly, pivotably connected to the body and selectively displaceable between a working position and a pivoted position, a grass collector, detachably connected to a rear end of the body, and arranged to collect grass clippings conducted from a cutting chamber to a discharge opening of the body, a cover, pivotably connected to the rear end of the body, which cover is arranged to cover the discharge opening when the grass collector is detached from the body, and which cover is arranged to rest on top of the grass collector when the grass collector is attached to the body. The handle assembly comprises a cover engaging member, arranged to cooperate with a portion of the cover, so as to facilitate pivoting of the cover from its position on top of the grass collector to a folded up position, when the handle assembly rotates from the working position to the pivoted position. Thereby, the operator does not use any of his or her hands to fold the cover, and the grass collector is easily reached.

DEFINITIONS

As used herein the following terms have the following meanings:

The "upward" and "downward" directions are defined based on a horizontal surface on which the lawn mower may be supported.

The "forward" direction is the direction in which an operator normally guides the mower when mowing grass.

The terms "proximal" and "distal" are used relative to a front end of the lawn mower body.

BRIEF DESCRIPTION OF THE DRAWINGS

The invention will be understood and appreciated more fully from the following detailed description, taken in conjunction with the drawings, in which:

FIG. 2b is a side view of the locking member of FIG. 2a.

FIG. 3b is a side view of the locking member of FIG. 3a.

FIG. 4b is a side view corresponding to FIG. 4a.

DESCRIPTION OF PREFERRED EMBODIMENTS

The present invention will be described more fully hereinafter with reference to the accompanying drawings, in which preferred embodiments of the invention are shown. The invention may, however, be embodied in many different forms and should not be construed as limited to the embodiments set forth herein; rather these embodiments are provided so that this disclosure will be thorough and complete, and will fully convey the scope of the invention to those skilled in the art. In the drawings, like numbers refer to like elements.

Figure 1:
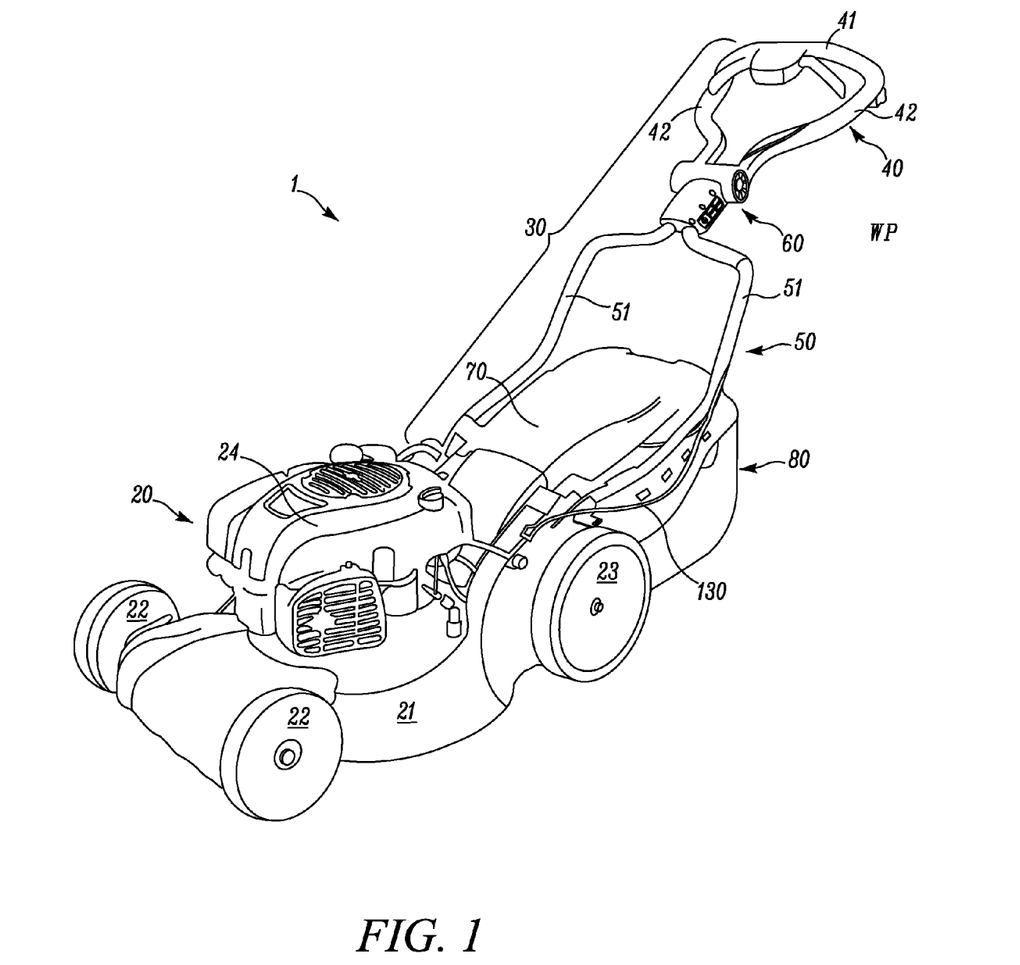
FIG. 1 is a perspective view of a walk-behind lawn mower comprising a handle control arrangement according to the invention.

Referring to FIG. 1, a walk-behind lawn mower 1 according to an embodiment of the invention comprises a body 20 with an engine 24 arranged to drive a cutting blade (not shown) in a cutting chamber (not shown) of a cutting deck 21 of the body 20. It also comprises a handle assembly 30 associated with the body 20. A pair of front wheels 22 is connected to a front end of the body 20 and a pair of rear wheels 23 is connected to a rear end of the body 20. A grass collector 80 is releasably carried on a rear portion of the body 20.

Grass clippings resulting from rotation of the cutting blade may be conducted from the cutting chamber to a discharge opening (not shown) of the body 20, and further into the grass collector 80 when the collector 80 is connected to the body 20.

The invention is applicable for both petrol driven and electrically powered lawn mowers.

It would also be possible to use a different a lawn mower in which the wheels are configured in another way than what is shown in the drawings, or even a hover type of lawn mower.

Cover

A cover 70 is arranged to cover the discharge opening when no grass collector 80 is attached to the body 20. This may be the case e.g. if the lawn mower operates in a mulching mode or during transportation of the lawn mower.

The cover 70 is pivotably connected to the body 20 about a cover pivot axis 70x. When the grass collector 80 is connected to the body 20, the cover rests on top of the grass collector 80, as shown e.g. in FIGS. 2a, 3a and 3d. In these figures, only an upper part of the grass collector 80 is shown.

Handle Assembly

In the embodiment according to the figures, the handle assembly 30 comprises an upper frame 40, a lower frame 50 and an intermediate portion 60 interconnecting the two frames 40, 50.

The lower frame 50 has a pair of lower arms 51. The lower arms 51 each have a proximal end secured to the cutting deck 21 and a distal end.

The upper frame 40 has upper arms 42, which in their distal ends are connected to an operator grip 41. As shown in the figures, the operator grip 41 may be formed integrally with the upper arms 42.

The distal ends of the lower arms 51 are connected to the proximal ends of the upper arms 42 by means of the intermediate portion 60. The upper frame 40 may be selectively pivotable relative to the lower frame 50 about a pivot axis defined by the intermediate portion 60. However, relative pivotal movement between two parts of the handle assembly 30 is not further discussed in this disclosure since it is not relevant to the invention. Instead it is hereinafter assumed that the lower frame 50 and the upper frame 40 have the relative configuration according to FIGS. 1, 3d and 4c. Pivotal movement of the handle assembly 30 relative to the body 20 of the lawn mower is therefore regarded as equal to pivotal movement of the lower frame 50 of the handle assembly 30 relative to the cutting deck 21 of the lawn mower 1.

Pivoting of Handle

Figure 2A:
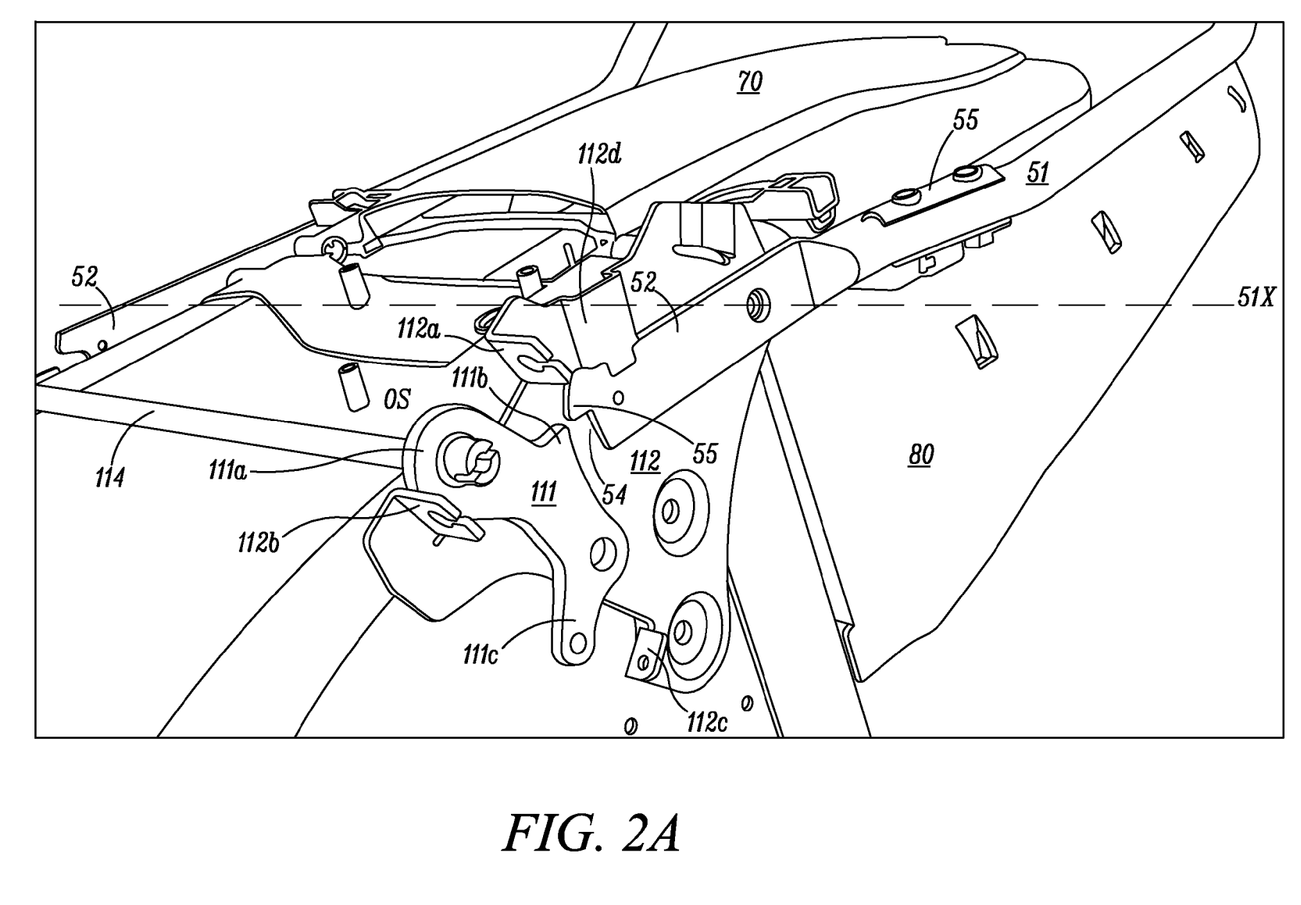
FIG. 2a is a schematic perspective view of a locking member of a handle control arrangement, in its open state.

The lower frame 50 is selectively pivotable relative to the cutting deck 21 of the lawn mower body 20. Each lower arm 51 is connected to the cutting deck 21 by means of a pivot joint 53 comprising a fastening means 53a, such as a threaded fastener 53a or pin member 53a, as shown e.g. in FIG. 2b and FIG. 5. The pivot axis 51x is defined by a line intersecting the pivot joint 53 of one lower arm 51 and the pivot joint 53 of the other lower arms 51. In FIG. 2a the fastening means 53a is omitted.

Figure 3A:
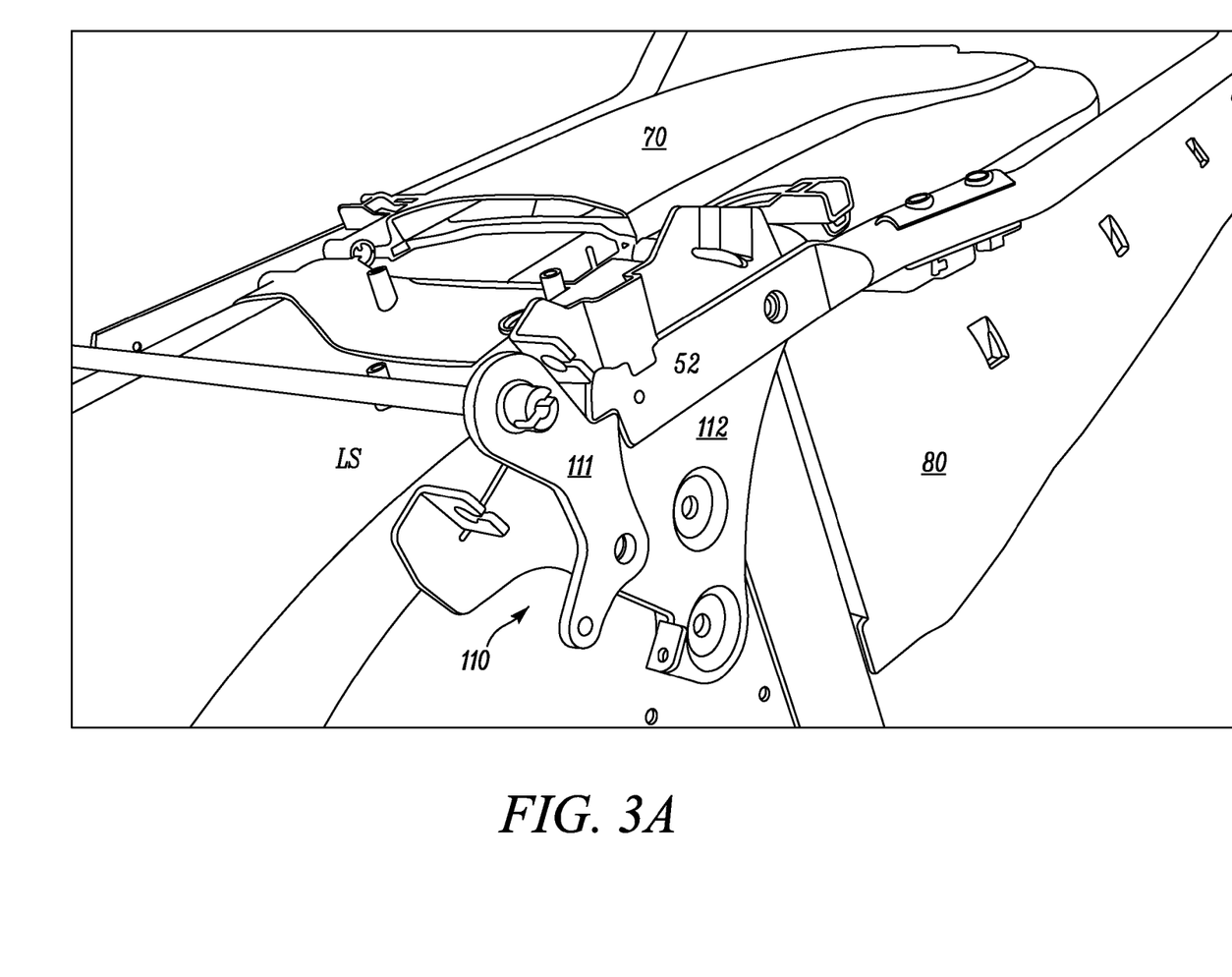
FIG. 3a is a schematic perspective view of a locking member of a handle control arrangement, in its locked state.
Figure 3B:
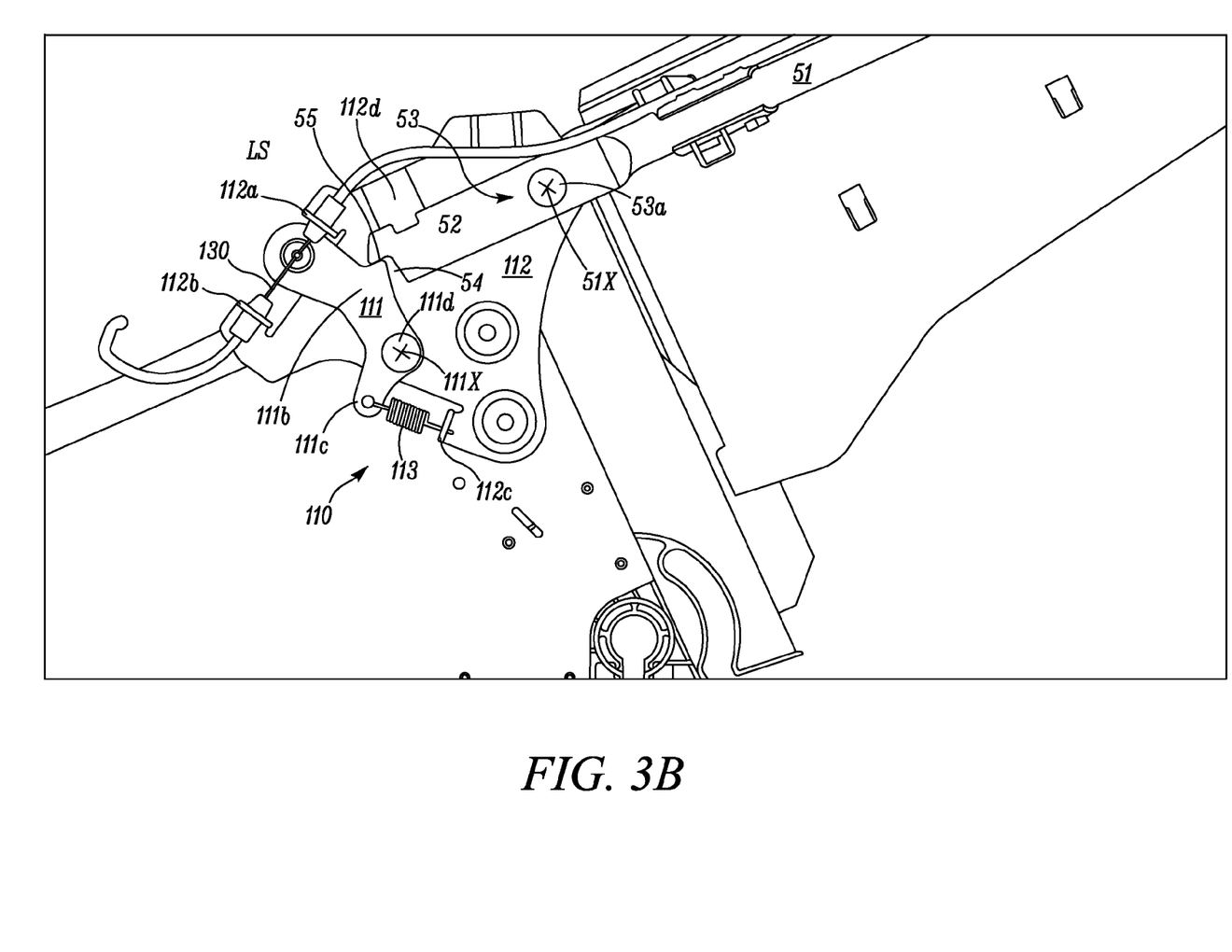

Each lower arm 51 is selectively pivotable between a working position WP and a collector emptying position EP. Thereby, the entire handle assembly 30 is selectively pivotable between a working position WP and a collector emptying position EP. In FIG. 1 and FIG. 3d, the handle assembly is shown in its working position WP. In FIG. 4c the handle assembly is shown in its collector emptying position EP.

Handle Control Arrangement

A handle control arrangement 100 is arranged to selectively enable or disable movement of the handle assembly 30 from the working position WP to the collector emptying position EP. The handle control arrangement has a resting state RS, in which the handle control arrangement allows pivoting of the handle assembly 30 from the working position WP to the collector emptying position EP. It also has an activated state AS, in which it does not allow the handle assembly to leave the working position WP. When the handle assembly is in the working position WP and the handle control arrangement is in the activated state AS, pivoting of the handle assembly 30 is consequently inhibited. Due to safety reasons, the handle control arrangement 100 is construed such that it can only be put in its activated state as long as the handle assembly is in the working position WP.

As shown in FIG. 4c, the handle control arrangement 100 comprises a locking member 110 and an actuating member 120. The handle control arrangement 100 is in its resting state RS when the actuating member 120 is in a resting position RP and the locking member is in an open state OS. The handle control arrangement 100 shown in FIG. 4c is accordingly in the resting state RS.

The handle control arrangement 100 is in its activated state AS when the actuating member 120 is in an activated position AP and the locking member 110 is in a locked state LS. The handle control arrangement 100 in FIG. 3d is in its activated state AS.

Locking Member

Hereinafter, the interaction between a lower arm 51 of a handle assembly 30 and a locking member 110 of a handle control arrangement 100 will be described. It is to be understood that although only the interaction between one of the lower arms 51 and its corresponding locking member 110, there can also be a locking member 110 on the other side of the lawn mower body 20, interacting in the same manner with the other lower arm 51 of the lower frame 50.

Figure 2B:
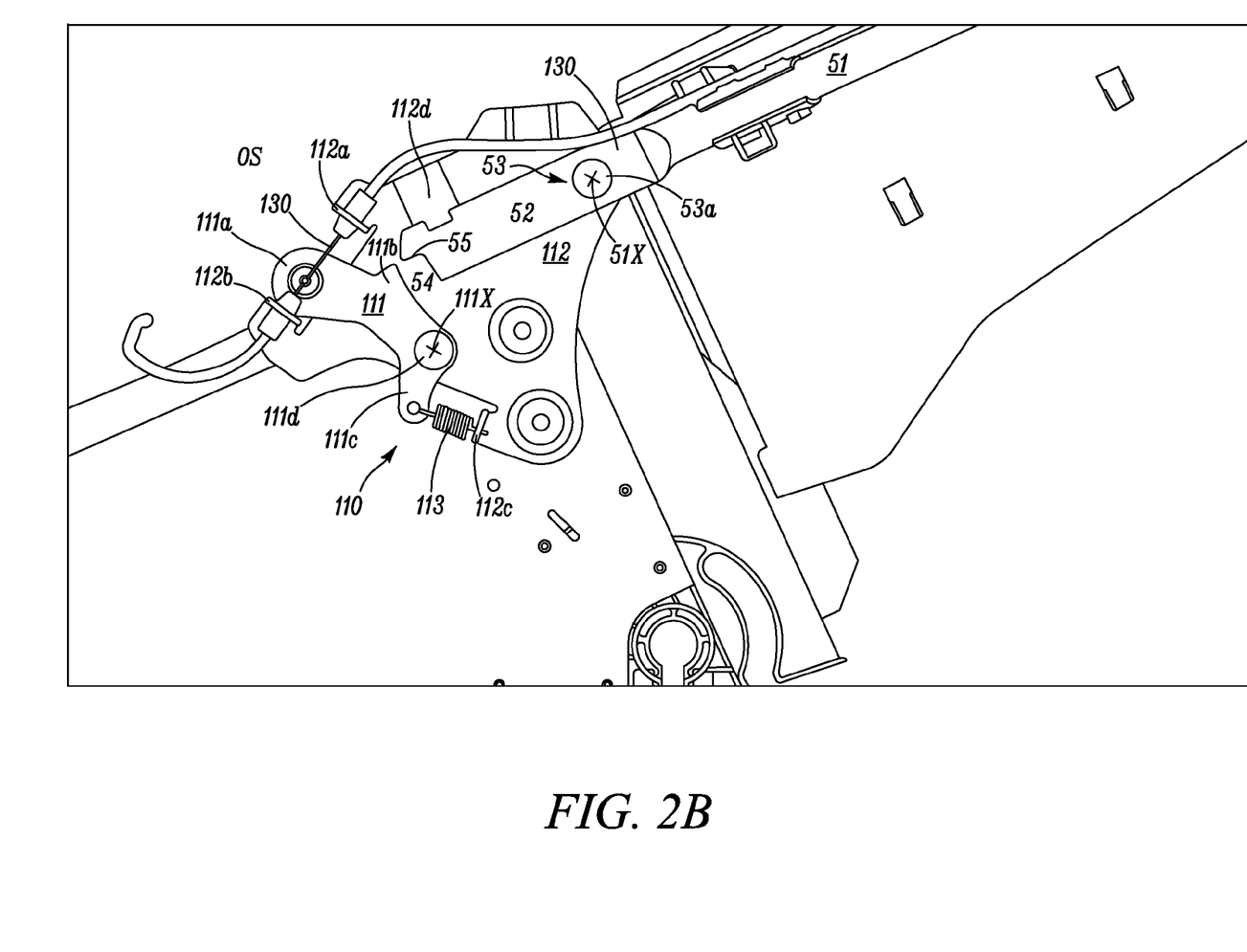

FIGS. 2a and 2b are different views of a locking member 110 according to an embodiment of the invention, in the open state OS. Some parts of the locking member 110 are omitted in FIG. 2a. The locking member 110 comprises a locking lever 111 and a handle support 112.

FIGS. 2a and 2b also illustrates a proximal end of a lower arm 51 of a handle assembly 30. As previously mentioned, the lower arm 51 is connected to the cutting deck 21 by means of a pivot joint 53 comprising a fastening means 53a, such as a threaded fastener 53a or a pin 53a as shown e.g. in FIG. 2b and FIG. 5. In FIG. 2a the fastening means 53a is omitted.

A pivot axis 51x of the handle assembly is defined by a line intersecting the pivot joint 53 of one of the lower arms 51 and the pivot joint 53 of the other of the lower arms 51.

As can be seen in e.g. FIG. 2a, the proximal end of a lower arm 51 can have a flat portion 52. In the free end 52a of this flat portion 52, an indentation 54 is formed so as to define a locking edge 55. The locking edge is arranged to cooperate with a locking lever 111 of the locking member 110.

Handle Support

The handle support 112 of the locking member 110 is fixedly connected to the cutting deck 21, and can be arranged between the flat portion 52 of the lower arm 51 and the cutting deck 21.

Figure 5:
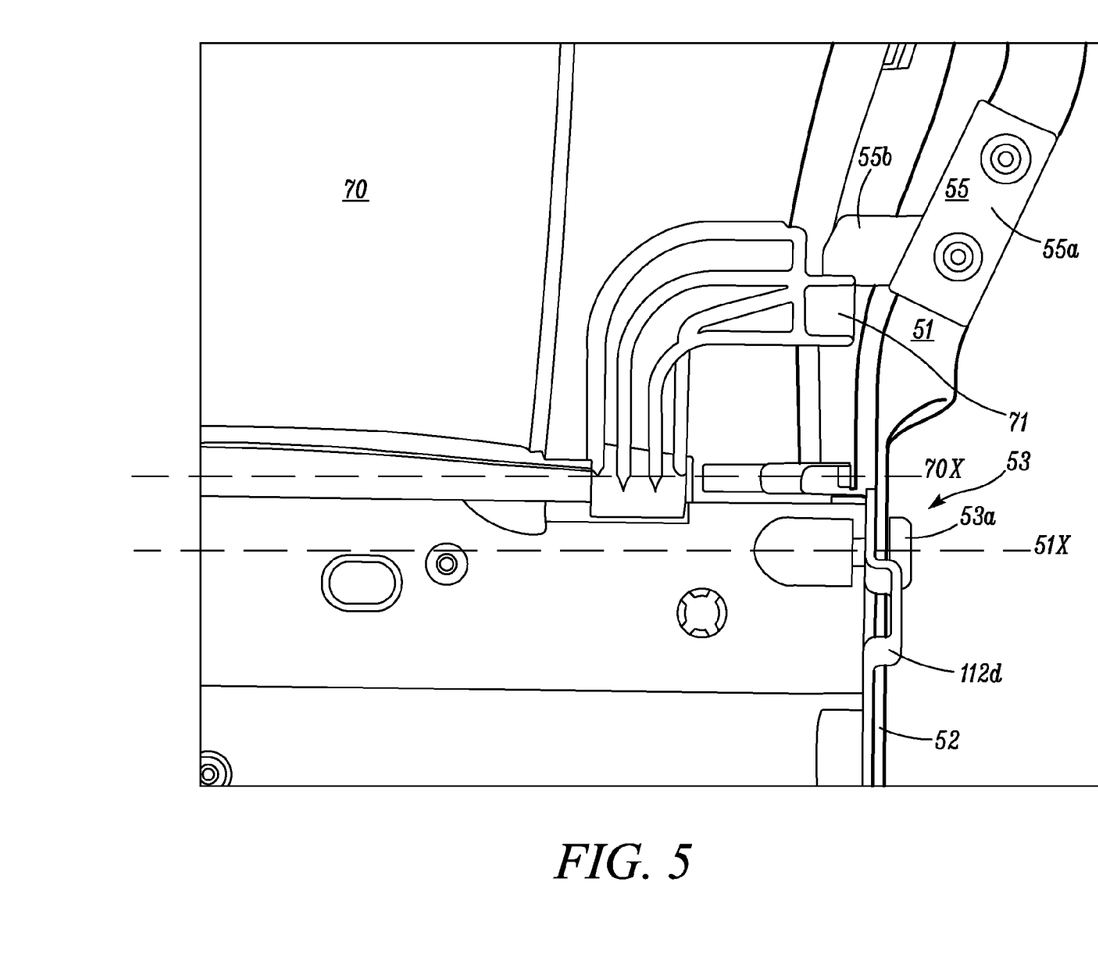
FIG. 5 is a top plan view partially showing a locking member, a lower arm and a cover.

The handle support 112 has a support portion 112d arranged to prevent the flat portion of the lower arm from rotating upwards when the handle assembly 30 is in the working position WP. Thereby, the operator grip 41 is inhibited from rotating downwards. In FIG. 5 the support portion 112d and the flat portion 52 of the lower arm 51 are shown from above. When the handle assembly 30 is in the working position WP a portion of an upper edge of the flat portion may rest against this support portion 112d.

The handle support 112 also has two wire guiding tongues 112a, 112b which may extend orthogonally to a main extension plane of the handle support 112. A control wire 130, operatively connecting the actuating member 120 and the locking member 110 of the handle control arrangement 100 is lead through holes or cut-outs in the wire guiding tongues 112a, 112b, as shown in FIG. 2b.

A spring holding tongue 112c can be formed in a lower portion of the handle support 112.

Locking Lever

The locking lever 111 of the locking member 110 is arranged to prevent the proximal end of the lower arm 51 from rotating downwardly when the handle assembly is in the working position. Thereby, it also prevents the handle assembly from leaving the working position WP.

According to an embodiment of the invention, the locking lever has a configuration according to FIGS. 2a and 2b etc. It may extend in a plane that is parallel to the main extension plane of the handle support, and which is coincides with a main extension plane of the flat portion of the lower arm.

The locking lever according to this embodiment has a head portion 111a, a shoulder portion 111b and a leg portion 111c.

The locking lever is pivotably connected to the handle support 112 by means of a connection joint 111d, and is rotatable about a pivot axis 111x which can be orthogonal to the main extension planes of the locking lever and the handle support.

The head portion 111a of the locking lever 111 is fixedly connected to a portion of the control wire which extends between the two wire guiding tongues 112a, 112b of the handle support 112.

A rod 114 interconnects the head portion of the locking lever on one side of the lawn mower body and a head portion 111a of a locking lever 111 of a locking member 110 on the other side of the body 20.

A spring 113 joins the leg portion 111c of the locking lever and the spring holding tongue 112c of the handle support, such that the leg portion 111c of the locking lever is biased towards the spring holding tongue 112c of the handle support. Thereby, the head 111a of the locking lever 111 is biased in a forward direction towards the foremost wire guiding tongue 112b of the handle support 112. Consequently the locking member 110 is normally disposed in its open state OS with a distance between the locking edge 55 and the shoulder portion 111b.

When the locking member is in the open state OS, it allows the handle assembly 30 to rotate from its working position WP to a collector emptying position EP.

Figure 4A:
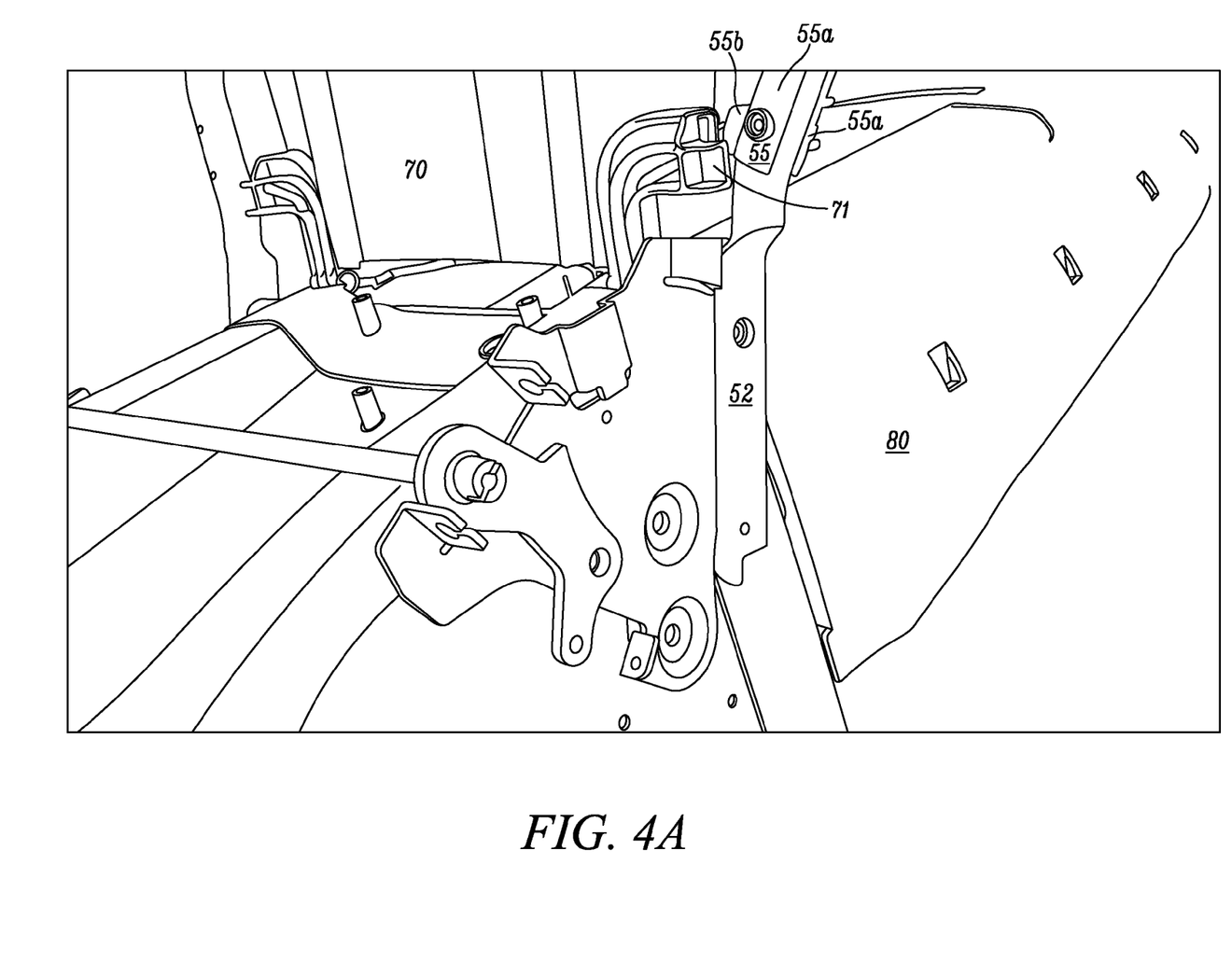
FIG. 4a is a schematic partial perspective view illustrating the locking member when the handle assembly is in a collector emptying position.
Figure 4B:
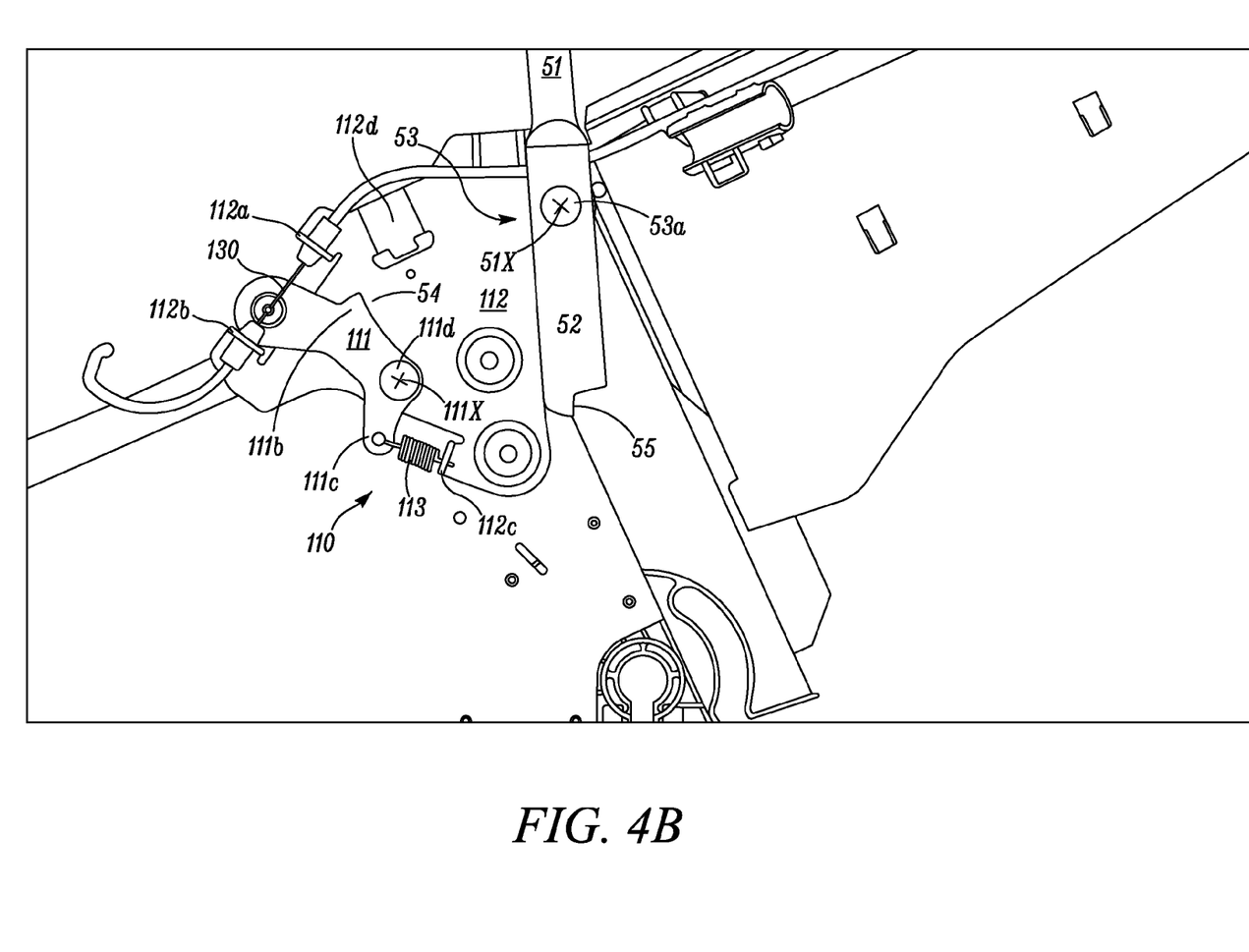
Figure 4C:
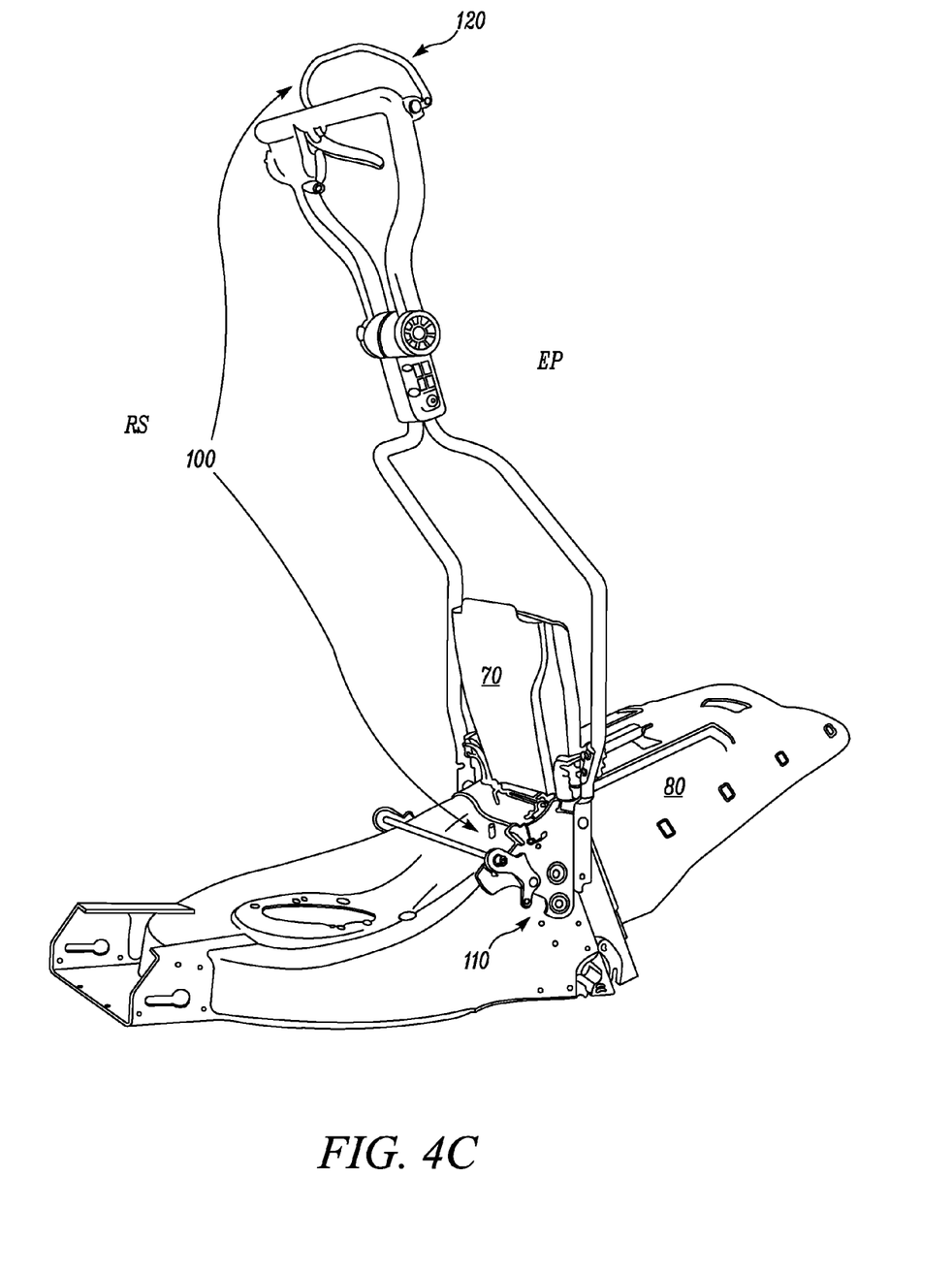
FIG. 4c is a partial perspective view of a lawn mower showing the handle assembly in its collector emptying position.

FIGS. 4a and 4b illustrate a configuration in which the handle assembly 30 has been pivoted to the collector emptying position EP. When the handle assembly is in the collector emptying position EP, a safety member, such as a spring (not shown) ensures that the handle control arrangement 100 is in its resting state RS, and consequently that the locking member is in its open state OS.

The shoulder portion 111b of the locking lever 111 can be complementary in shape to the indentation 54 formed in the lower arm 51, such that it can cooperate with the locking edge 55, when the locking member is in the locked state LS, and the lower arm is in the working position. Thereby it prevents the flat portion of the lower arm from rotating downwardly when the locking member is in this locked state LS. Consequently, the handle assembly 30 is locked in the working position WP when the locking member 110 is in the locked state LS.

The operator may force the locking member to switch from the open state OS to the locked state LS by activating the actuating member 120, which is operatively connected to the locking member 110 by means of the control wire 130.

When the actuating member is forced to its activated position AP the control wire 130 is drawn backwardly towards the operator grip 41, and the head portion 111a of the locking lever 111, which is fixedly connected to the control wire 130, is thereby forced towards the rearmost wire guiding tongue 112a of the handle support, against the spring forces.

Then the shoulder portion of the locking lever will abut on the edge portion of the lower arm, such that the lower arm 51 is locked in the working position WP.

As soon as the operator releases the actuating member 120, the locking member 110 will return to the open state OS, due to the spring forces. The shoulder portion 111b will detach from the edge 55, thus enabling the lower arm 51—and thereby the whole handle assembly—to leave the working position WP.

Control Bail

According to the embodiments shown in the figures herein, the actuating member 120 is a control bail 120.

Figure 2C:
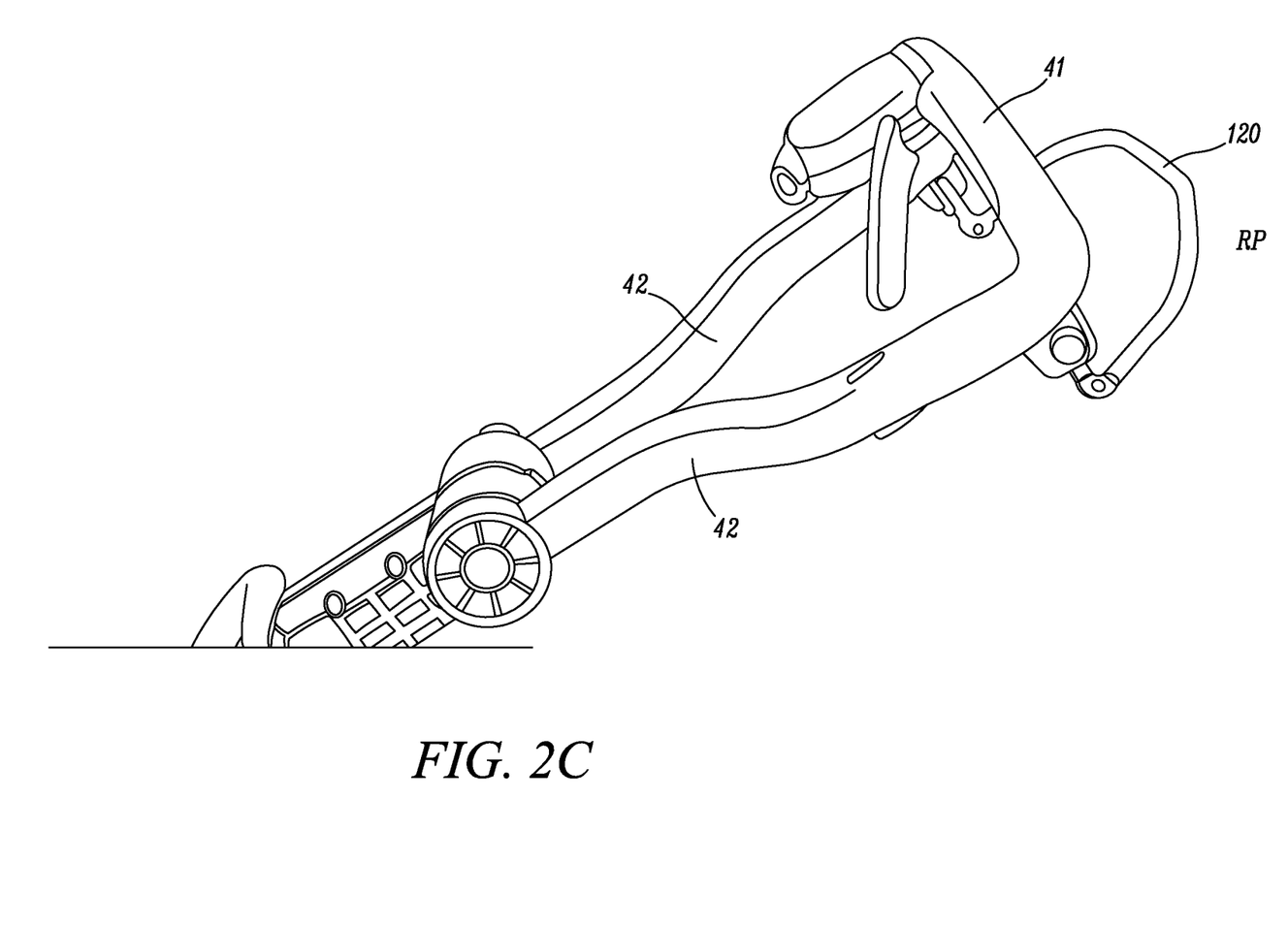
FIG. 2c is a perspective view of an upper frame of a handle assembly, with the control bail in its resting position.
Figure 3C:
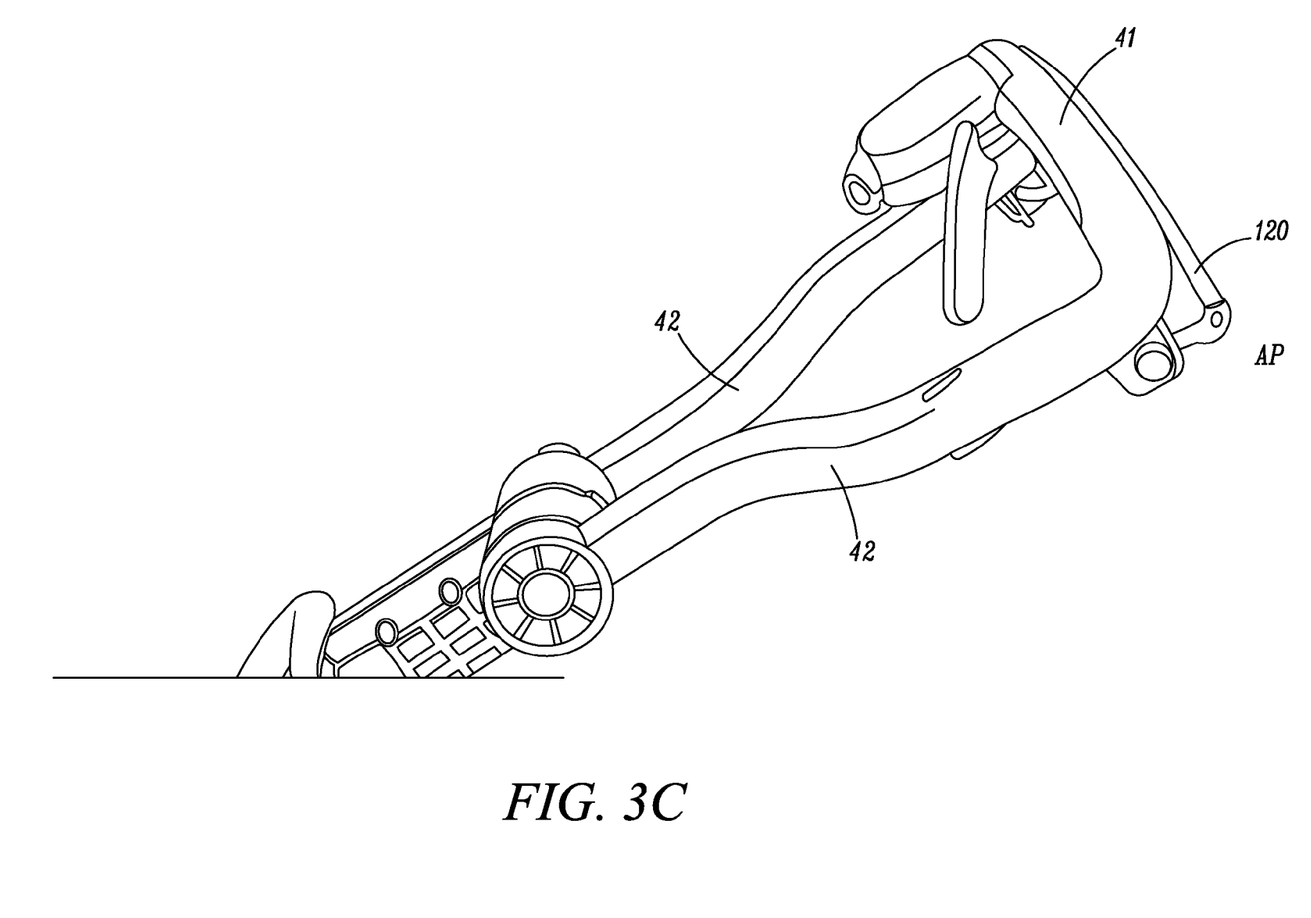
FIG. 3c is a perspective view of an upper frame of a handle assembly, with the control bail in its activated position.
Figure 3D:
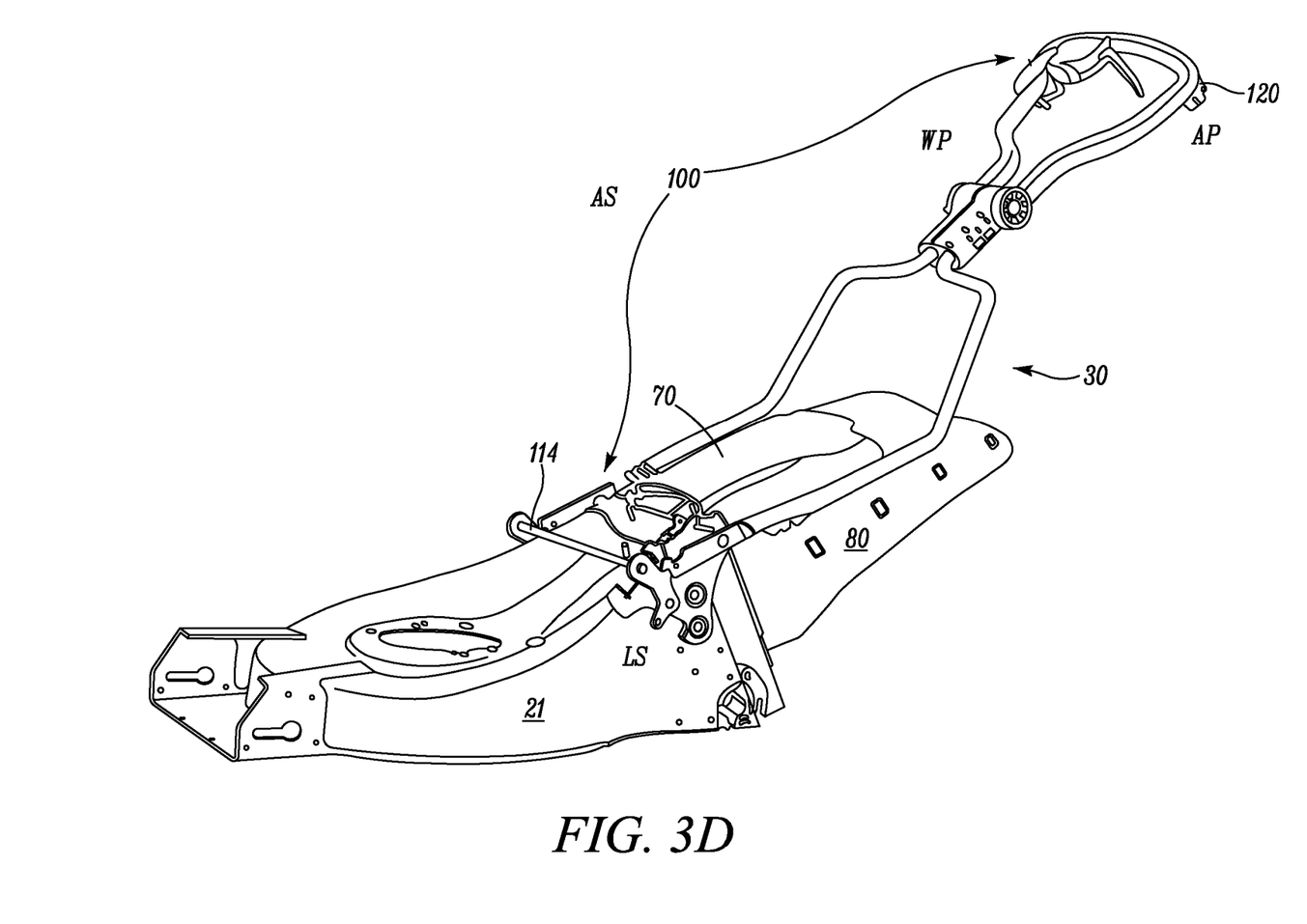
FIG. 3d is a partial perspective view of lawn mower showing the handle assembly in its working position and the locking member in its locked state.

The control bail 120 selectively displaceable between a resting position RP, as shown in FIG. 2c, and an activated position AP as shown in FIG. 3c. The control bail 120 is normally biased in a direction towards the resting position RP. In order to switch from the resting position to the activated position, an operator of the lawn mower presses the control bail 120 towards the operator grip 41.

The control bail 120 has two functions, as will be described hereinafter.

Firstly, the control bail 120 is operatively connected to the locking member 110, e.g. by means of the control wire 130 as shown in FIG. 1 and FIG. 2B. Pivotal movement of the control bail relative to the operator grip thereby controls the state of the locking member. When an operator of the lawn mower grips the operator grip and the control bail, and presses the control bail towards the grip, such that it reaches the activated position, the control bail forces the control wire to move in an upward backward direction towards the grip. This movement forces the locking member to switch from the open state OS to the locked state LS, as described above. Activation of the control bail thus inhibits the handle assembly from pivoting from the working position to the collector emptying position.

As soon as the operator releases the control bail, it returns to the resting position and allows the locking member 110 to return to its open state OS. Then, the operator might pivot the handle assembly to the collector emptying position.

In the lawn mower according to the invention, the control bail 120 is operatively connected not only to the locking member of the handle control arrangement but also to either the engine 24 or to a blade brake clutch, since the control bail is used in an Operator Presence Control (OPC) system of the lawn mower.

OPC

The OPC system is used to prevent unintentional rotation of the cutting blade. OPC systems are well known in the art, and will only be described in brief herein. They are arranged such that an operator of the lawn mower has to activate the OPC system in order to enable rotation of the cutting blade. An OPC system may e.g. be activated by means of a control bail connected to the operator grip. A commonality between different OPC systems is that they comprise a device which inhibits rotation of the cutting blade of the lawn mower, such as a blade brake. In the resting state of the OPC system, this rotation inhibiting device inhibits rotation of the cutting blade. In the activated state of the OPC system, the rotation inhibiting device allows rotation of the cutting blade.

One kind of OPC system is arranged such that the rotation inhibiting device is implemented as a blade break arranged on the engine shaft and a switch which stops the engine if the OPC system is deactivated. If the control bail is operatively connected to the engine by means of the control wire, the engine can only operate as long as the control bail is in the activated position AP. When the operator releases the control bail (deactivates the OPC system), the blade brake is activated in order to stop rotation of the cutting blade, and the switch is activated such that engine is short-circuited and stops running.

According to another solution, the control bail can be operatively connected to a blade brake clutch by means of the control wire. Upon activation of the blade brake clutch, such that the blade brake is activated, rotation of the cutting blade is inhibited but the engine might still operate. This means that the engine might operate even if the control bail in its resting position RP, although the cutting blade is not rotatable when the control bail is in the resting position RP.

The operative connection between the control bail and the engine or the blade brake clutch, may be achieved by arranging the control wire 130 such that it continues from the locking member of the handle assembly control arrangement, to the engine or to a blade brake clutch. As described above, both configurations results in that rotary movement of the cutting blade is inhibited as long as the control bail is not in the activated position AP.

Cover Pivoting Assembly

Before detaching the grass collector from the lawn mower body, the operator needs to fold away the cover 70 from the top of the grass collector 80, in order to reach a grip of the grass collector.

In order to facilitate this cover folding operation, one or both of the lower arms 51 of the handle assembly can comprise cover engaging members 55. The cover engaging members 55 may have a main portion 55a, clamping the lower arm 51, and a protrusion 55b, extending towards the cover 70.

The protrusions 55b can be arranged to cooperate with protrusions 71 formed on the side edges of the cover 70. An exemplary configuration is illustrated in FIG. 5.

In this way an arrangement is achieved in which the cover 70 is automatically pivoted about its pivot axis 70x as soon when the handle assembly 30 in pivoted from the working position WP to the collector emptying position EP. This is best shown in FIG. 4c. The cover pivot axis 70x is preferably different from the pivot axis 51x of the handle assembly.

Thereby the operator does not need to use any of his or her hands to fold back the cover in order to remove it from the top of the grass collector 80 when he or she wants to remove and empty the grass collector.

The protrusions 71 of the cover 70 and the cover engaging means 55 of the lower arm 51 may be configured such that the cover engaging member 55 releases the cover protrusions 71 when the handle assembly has come to a certain degree of rotation. Such a configuration may be useful if the handle assembly is pivotable further from the collector emptying position to a transport position. In that case, the cover will pivot with the handle assembly from the working position to the collector emptying position and possibly a bit further. If the handle assembly is pivoted even more, the cover will be released and will rotate back to its position on top of the grass collector, or covering the discharge opening of the body if no grass collector is present.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. A walk-behind lawn mower, comprising
a body with an engine driving a cutting blade,
a handle assembly pivotably connected to the body, and
a handle control arrangement for controlling pivotal movement of the handle assembly relative to the body, between a working position and a pivoted position, the handle control arrangement, comprising
a locking member selectively displaceable between an open state in which the locking member allows pivotal movement of the handle assembly from the working position to the pivoted position, and a locked state in which the locking member inhibits pivotal movement of the handle assembly from the working position to the pivoted position,
an actuating member operatively connected to the locking member and controlling the state of the locking member, wherein the actuating member is also arranged to control activation and deactivation of a device arranged to inhibit rotation of the cutting blade of the walk-behind lawn mower, and
a cover pivotably connected to a rear end of the body, which cover is arranged to cover a discharge opening when a grass collector is detached from the rear end of the body, and which cover is arranged to rest in a position on top of the grass collector when the grass collector is attached to the body, wherein the cover comprises a cover protrusion and the handle assembly comprises a cover engaging member defined by a protrusion, the cover engaging member is arranged to cooperate with the cover protrusion, so as to facilitate pivoting of the cover from the position on top of the grass collector to a folded up position, when the handle assembly rotates from the working position to the pivoted position,
wherein the cover engaging member releases the cover protrusion causing the cover to return to the position on top of the grass collector, in response to the handle assembly being rotated from the pivoted position to a transport position,
wherein the locking member comprises a head portion, a shoulder portion, a joint connection, and a biasing element,
wherein the head portion is disposed at a first end of the locking member and the head portion is operatively connected to the actuating member,
wherein the shoulder portion is disposed at the first end of the locking member and the shoulder portion is configured to cooperate with a locking edge in the locked state, and
wherein the joint connection is disposed between the first end of the locking member and a second end of the locking member, and wherein the joint connection enables the locking member to pivot between the locked state and the open state.

2. The walk-behind lawn mower according to claim 1, wherein the actuating member has a resting position associated with the open state of the locking member and activation of the device arranged to inhibit rotation of the cutting blade, and an activated position associated with the locked state of the locking member and deactivation of the device arranged to inhibit rotation of the cutting blade.

3. The walk-behind lawn mower according to claim 1, wherein the actuating member is connected to an operator grip of the handle assembly.

4. The walk-behind lawn mower according to claim 1, wherein the actuating member is operatively connected to the locking member by a control wire.

5. The walk-behind lawn mower according to claim 4, wherein the control wire operatively connects the actuating member and a blade brake clutch of the lawn mower.

6. The walk-behind lawn mower according to claim 4, wherein the control wire operatively connects the actuating member and the engine.

7. The walk behind lawn mower according to claim 1, wherein the locking member is arranged on a first side of the body, and wherein the locking member is arranged to selectively engage and disengage a proximal end of an arm of the handle assembly.

8. The walk-behind lawn mower according to claim 7, wherein the handle control arrangement comprises a second locking member, arranged on a second side of the body, opposite to the first side, which second locking member is arranged to cooperate with a second arm of the handle assembly.

9. The walk behind lawn mower according to claim 1, wherein the locking member comprises a locking lever arranged to inhibit a proximal end of an arm of the handle assembly from rotating toward the pivoted position when in the locked state.

10. The walk behind lawn mower according to claim 1, wherein in the transport position, the handle assembly is rotated a predefined amount past the pivoted position away from the working position.

11. The walk behind lawnmower according to claim 1, wherein the actuating member is operatively connected to an operator grip of the handle assembly and operatively connected to the locking member by a control wire.

12. The walk behind lawn mower according to claim 1, wherein the handle assembly pivotably connected to the body further comprises a handle support operatively connected to the body at a first end and the handle support pivotably connected to the handle assembly at a second end.

13. The walk behind lawn mower according to claim 1, wherein the handle support is configured to prevent the handle assembly from rotating past the working position in a direction away from the pivoted position.

14. A walk-behind lawn mower comprising
a body,
a handle assembly pivotably connected to the body and selectively displaceable between a working position and a pivoted position,
a grass collector detachably connected to a rear end of the body, and arranged to collect grass clippings conducted from a cutting chamber to a discharge opening of the body,
a cover pivotably connected to the rear end of the body, which cover is arranged to cover the discharge opening when the grass collector is detached from the body, and which cover is arranged to rest in a position on top of the grass collector when the grass collector is attached to the body, wherein the cover comprises a cover protrusion and the handle assembly is arranged to cooperate with the cover protrusion, so as to facilitate pivoting of the cover from the position on top of the grass collector to a folded up position, when the handle assembly rotates from the working position to the pivoted position,
wherein the handle assembly comprises a cover engaging member arranged to cooperate with the cover protrusion, so as to facilitate the pivoting of the cover from the position on top of the grass collector to the folded up position, when the handle assembly rotates from the working position to the pivoted position,
wherein the cover engaging member releases the cover protrusion causing the cover to return to the position on top of the grass collector in response to the handle assembly being rotated from the pivoted position to a transport position.

15. A walk-behind lawn mower according to claim 14, wherein the handle assembly is pivotable relative to the body about a first pivot axis which differs from a second pivot axis about which the cover is pivotable relative to the body.

16. A walk-behind lawn mower according to claim 15, wherein the first pivot axis and the second pivot axis are essentially parallel.

17. A walk-behind lawn mower according to claim 14, wherein the cover engaging member has a main portion arranged to clamp an arm of the handle assembly, and a protrusion extending in a direction which is essentially parallel to the pivot axis of the handle assembly.

18. The walk behind lawn mower according to claim 14, wherein the locking member comprises a locking lever arranged to inhibit a proximal end of an arm of the handle assembly from rotating toward the pivoted position when in the locked state.

19. The walk behind lawnmower according to claim 14, wherein in the transport position, the handle assembly is rotated a predefined amount past the pivoted position away from the working position.

20. The walk behind lawn mower according to claim 14, wherein the handle assembly pivotably connected to the body further comprises a handle support operatively connected to the body at a first end and the handle support pivotably connected to the handle assembly at a second end.

* * * * *